(12) United States Patent
Elliott

(10) Patent No.: US 7,228,288 B2
(45) Date of Patent: Jun. 5, 2007

(54) METHOD OF REPEATEDLY SECURITIZING INTELLECTUAL PROPERTY ASSETS AND FACILITATING INVESTMENTS THEREIN

(75) Inventor: Douglas R. Elliott, St. Louis, MO (US)

(73) Assignee: TEQ Development, St. Louis, MO (US)

( * ) Notice: Subject to any disclaimer, the term of this patent is extended or adjusted under 35 U.S.C. 154(b) by 774 days.

(21) Appl. No.: 09/758,624

(22) Filed: Jan. 11, 2001

(65) Prior Publication Data

US 2001/0042034 A1 Nov. 15, 2001

Related U.S. Application Data

(60) Provisional application No. 60/175,572, filed on Jan. 11, 2000.

(51) Int. Cl.
*G06Q 40/00* (2006.01)
(52) U.S. Cl. .................. 705/35; 705/1; 705/4; 705/36; 705/59; 364/408; 707/3
(58) Field of Classification Search ............... 705/1, 705/36, 54, 38, 35, 4, 59; 716/1; 707/3; 364/408
See application file for complete search history.

(56) References Cited

U.S. PATENT DOCUMENTS

| | | | |
|---|---|---|---|
| 5,126,936 A * | 6/1992 | Champion et al. ............. | 705/36 |
| 5,148,365 A | 9/1992 | Dembo ........................ | 364/402 |
| 5,193,056 A | 3/1993 | Boes ........................... | 364/408 |
| 5,530,520 A | 6/1996 | Clearwater | |
| 5,644,726 A | 7/1997 | Oppenheimer .............. | 395/238 |
| 5,689,650 A | 11/1997 | McClelland et al. ........ | 395/236 |
| 5,689,651 A | 11/1997 | Lozman ...................... | 395/237 |
| 5,704,045 A | 12/1997 | King et al. .................. | 395/235 |
| 5,735,550 A | 4/1998 | Hinkle | |
| 5,742,775 A | 4/1998 | King .......................... | 395/238 |
| 5,761,648 A | 6/1998 | Golden et al. ................ | 705/14 |
| 5,774,883 A | 6/1998 | Andersen et al. | |
| 5,806,047 A | 9/1998 | Hackel et al. ................ | 705/36 |
| 5,806,048 A | 9/1998 | Kiron et al. .................. | 705/36 |
| 5,812,988 A | 9/1998 | Sandretto ..................... | 750/36 |
| 6,018,714 A * | 1/2000 | Risen et al. .................. | 705/4 |

FOREIGN PATENT DOCUMENTS

EP 0 825 544 A1 2/1998

OTHER PUBLICATIONS

Kieso et al "Intemediate Accouting", John Wiley & Sons, Inc., eighth edition 1995, pp. 571-619; ISBN 0-471-59759-7 (total 49 pages).*

(Continued)

*Primary Examiner*—Ella Colbert
*Assistant Examiner*—Harish T. Dass
(74) *Attorney, Agent, or Firm*—Storm LLP; Paul V. Storm; John J. Patti

(57) ABSTRACT

The present invention relates to methods of repeatedly valuing intellectual property assets and securitizing such assets. The present invention provides a means whereby holders or owners of proprietary intellectual property may readily determine the value to the business of the securitization of their intellectual property estate and obtain capital by securitizing all or part of their intellectual property estate.

6 Claims, 4 Drawing Sheets

OTHER PUBLICATIONS

Mitre, Web page "Technology Transfer Office—Overview".*
Goodman, Dictionary of Finance and Investment Terms, fifth edition Barron's, 1998, 3 pages.*
DeMatteis "From Patent to Profit—Scretes & Strategies For The successful Inventor", Avery, ISBN: 0-89529-879-1, 1998 (p. 245-263, plus cover page).*
FindLaw for Legal Professionals "US Fed Circuit Court of Appeals—Rhone-Poulence v Dekalb Genetics", dated Mar. 26, 2002.*
Thomas M. Apke "Planning the Acquistion of Intellectual Property Rights in United States", Managerial Law, Patrington: 1998 vol. 40, Iss 6; p. 17, 11 (8 page).*
Dyan Machan, "An Edison for a New Age?", FORBES, May 17, 1999, pp. 178-182 and 184-185.
Jay Palmer, "Dell-phic Oracle" Michael Dell's vision: more internet, more access, more change, Barron's: The Dow Jones Business and Financial Weekly, Jun. 21, 1999, pp. 33, 34 and 36.
Richard Binns et al., "Using IPR to Raise Debt Capital," les Nnouvelles, Jun. 1999, pp. 78-80.
Neil D. J., "The Valuation of Intellectual Property" *International Journal of Technology Management, 1988,* Switzerland, vol. 3, No. 1-2, pp. 31-42, XP 000900595.
Mansini R. et al., "Selection of Lease Contracts in an asset-backed Securitization: a real case analysis", *Workshop of Decision Theory and Decision Support, Luxemburg, Austria, Feb. 25-27, 1998.* vol. 28, No. 4, pp. 739-754, XP-000900694.
Thurm, Scott, "A Flood of Web Patents Stirs Dispute Over Tactics," The Wall Street Journal, Oct. 9, 1998, pp. B1, B4.
Fremgen, James M., Accounting for Managerial Analysis, 1972, pp. 388-399, Richard D. Irwin, Inc., Homewood, IL, USA.
"Industry Trends in Research Support and Links to Public Research," Jun. 25, 1998, National Science Board.
Graef, Jean, "Measuring Intellectual Assets", Montague Institute Review, Mar. 1, 1997.
Bowen, Ted Smalley, "Aurigin Application Helps Users Get a Grip on Intellectual Assets", Enterprise Computing, 1998, InfoWorld Publishing Co., San Mateo, CA.
Bingaman, Anne, "Antitrust, Innovation and Intellectual Property," presented to the Program on Antitrust & Intellectual Property, Oct. 7, 1994, Stanford Law School, Stanford, CA.
Standard Federal Tax Reports, Code Section 174, "Research Expenditures," 1997, pp. 27, 118-127, 151, Commerce Clearing House, Inc.
Klein, Joel I., "Cross-Licensing and Antitrust Law" presented to the American Intellectual Property Law Association on May 2, 1997, San Antonio, Tx., pp. 4-5.
Carney, Robert T. and McGavock, Daniel M., "Tax Strategies for Protecting Value of IP," Mar. 1997, pp. 21-22, les Nouvelles.
Solt, Michael E., "Sword Financing of Innovation in the Biotechnology Industry," Financial Management, Summer 1993, vol. 22, No. 2, p. 173 et seq.
"Managing, Valuing and Protecting Intellectual Assets", Report No. 1182-97-CH, 1997, The Conference Board.
McGavock, Danial M., and Lasinski, Michael J., "IP Survey Finds 'Gaps' in Information," Sep. 1998, p. 113, les Nouvelles.
Trade Regulation Reports, "Patents, Trademarks, Copyrights," Sections 5080, 5085 & 5100, 1989, Commerce Clearing House, Inc.
Orleans, G.P., "Pricing Technology Licensing," Licensing Law Handbook, Ch. 2, pp. 119-131 & 277, 1982, Clark Boardman Co., Ltd., New York, NY.
Antitrust Guidelines for the Licensing of Intellectual Property, Apr. 6, 1995, U.S. Department of Justice & the Federal Trade Commission.

* cited by examiner

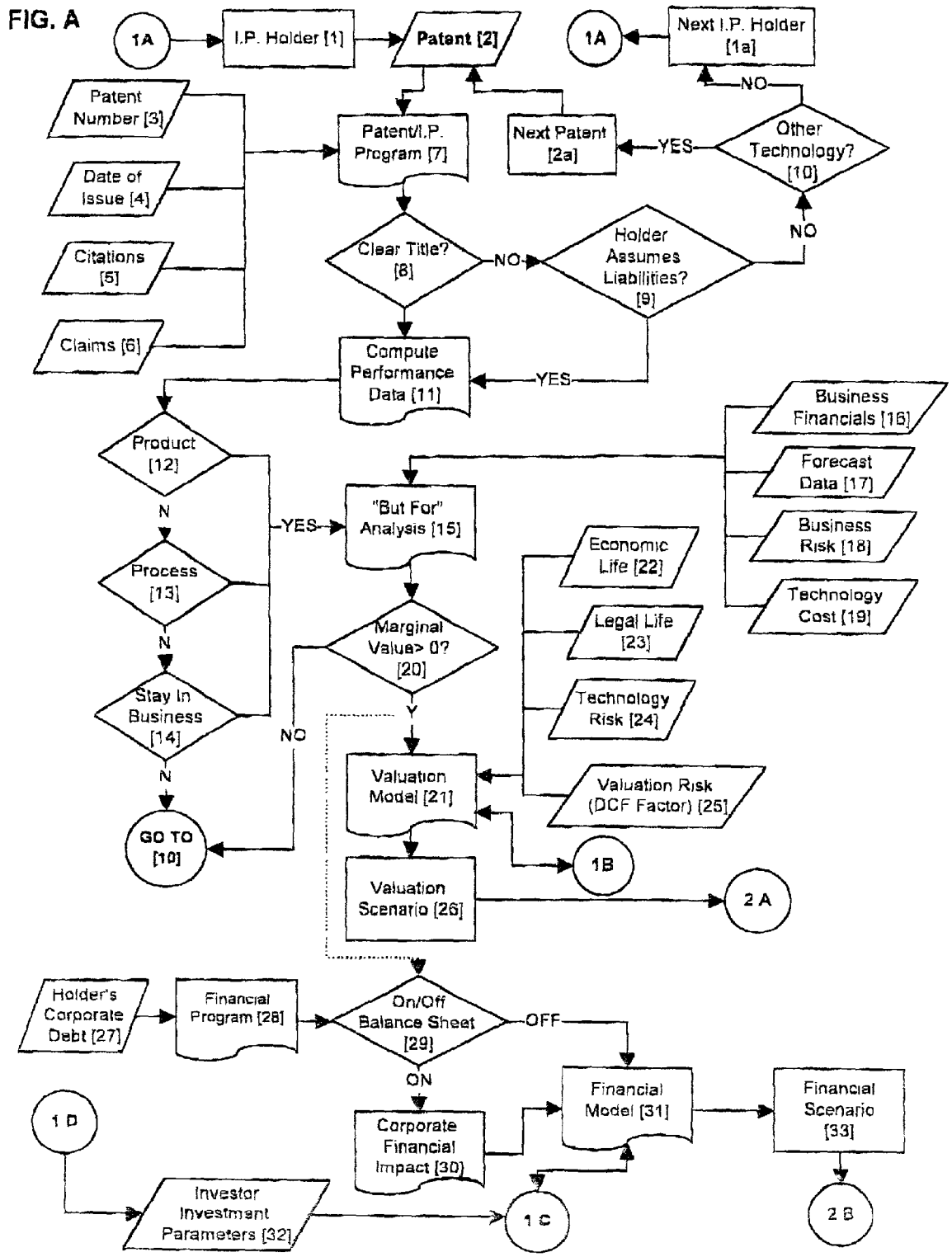

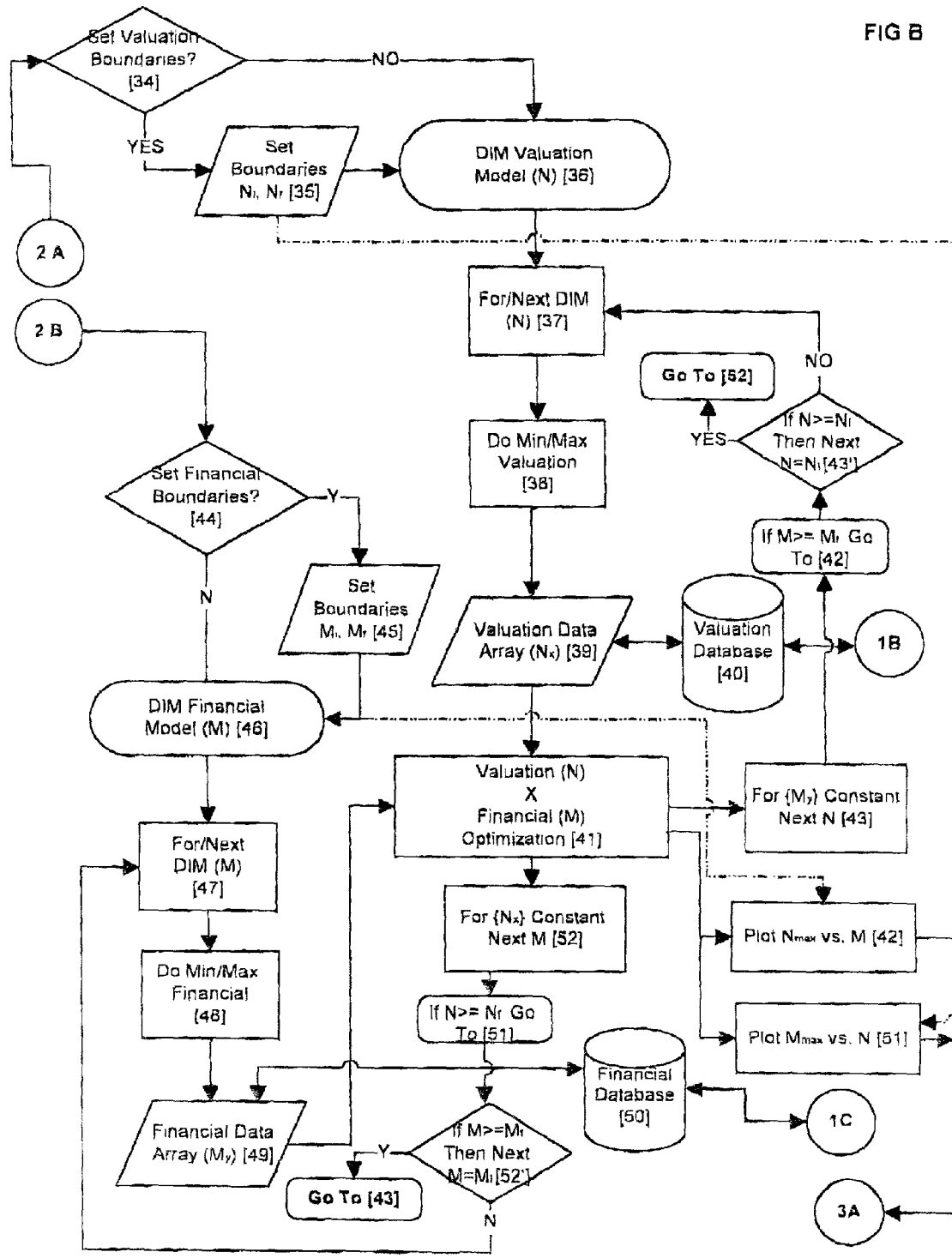
FIG B

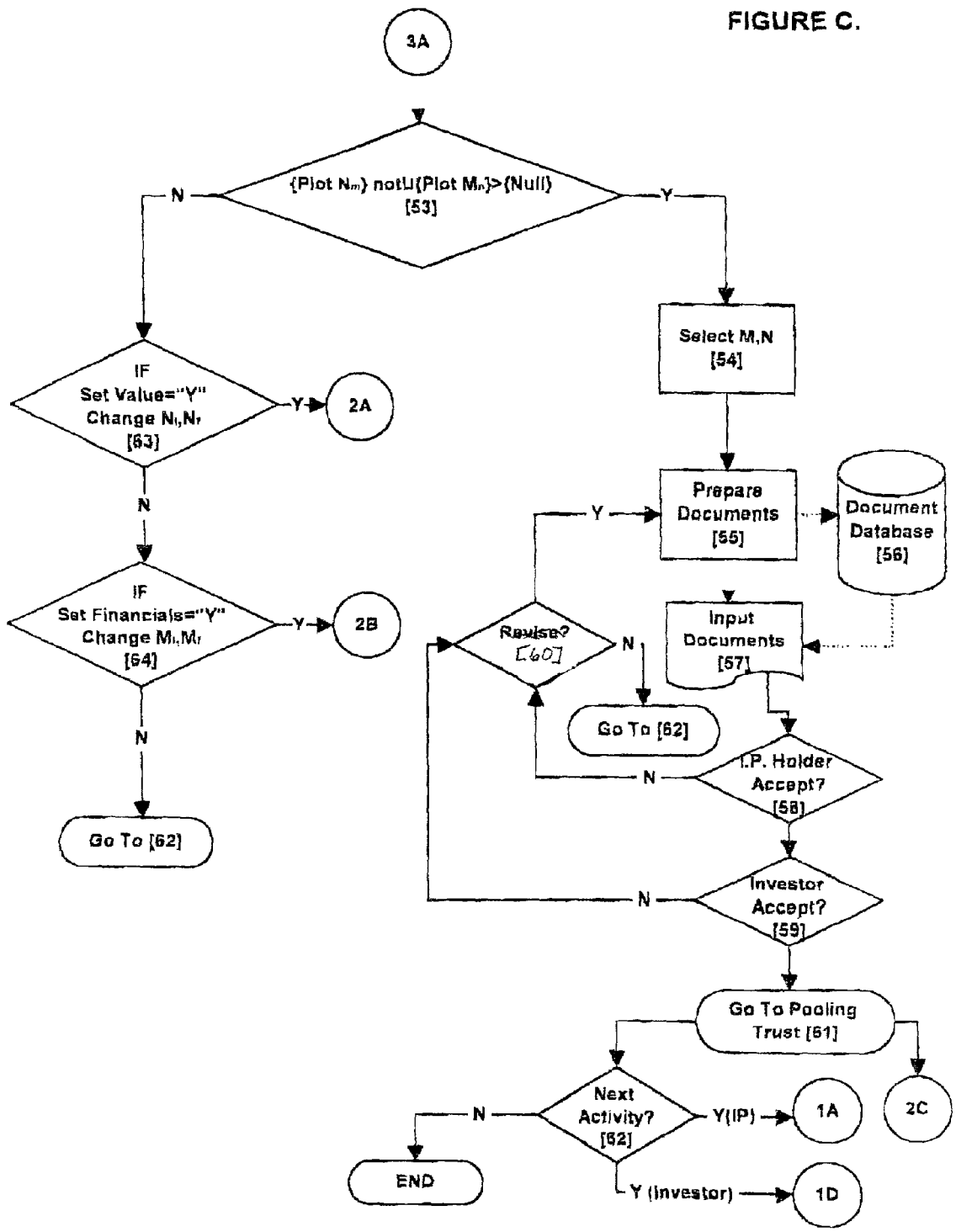

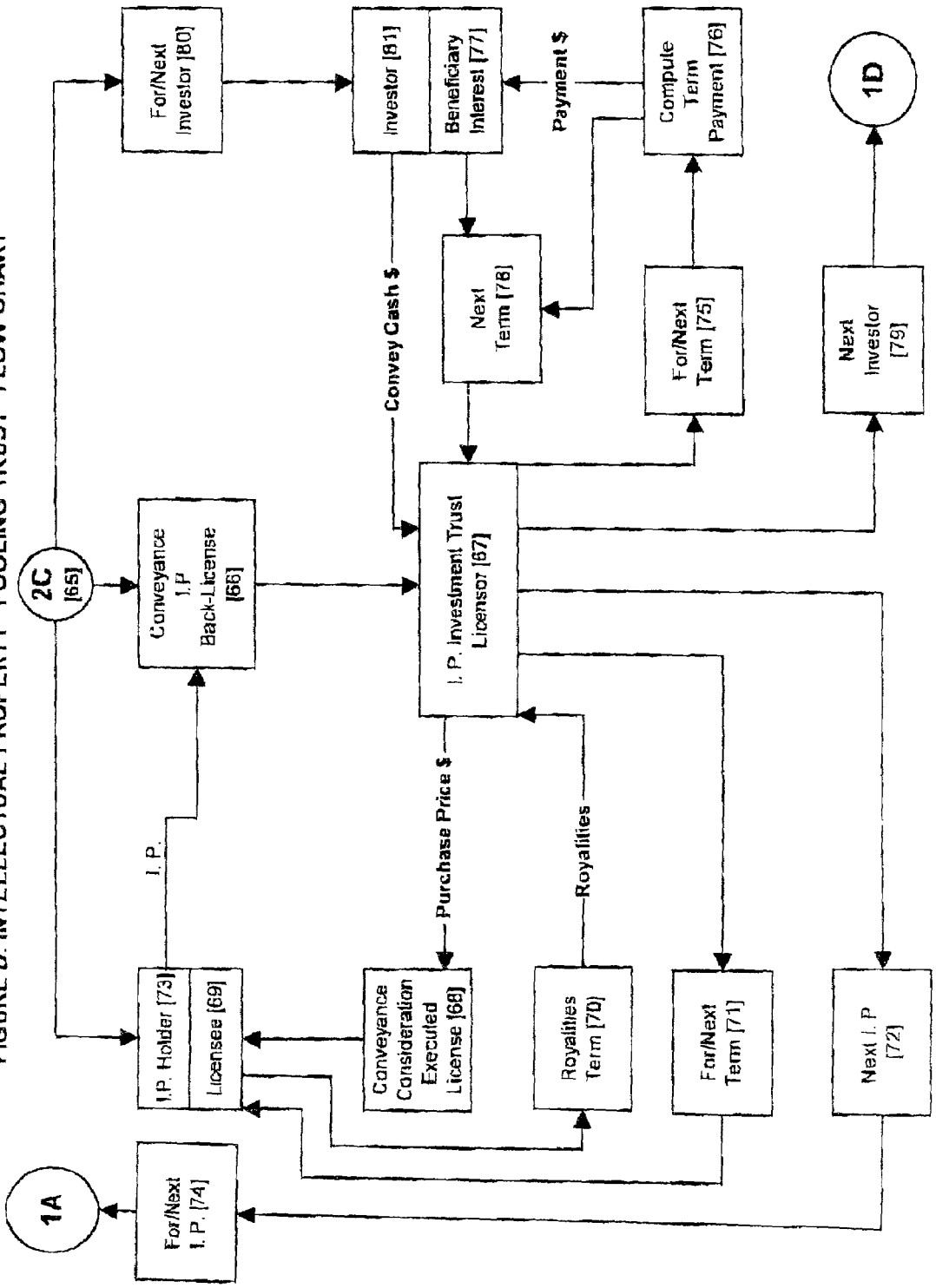
FIGURE D. INTELLECTUAL PROPERTY "POOLING TRUST" FLOW CHART

METHOD OF REPEATEDLY SECURITIZING INTELLECTUAL PROPERTY ASSETS AND FACILITATING INVESTMENTS THEREIN

CLAIM OF PRIORITY

This invention claims priority to Provisional Patent Application No. 60/175,572 filed on Jan. 11, 2000, and Utility Patent Application Ser. No. 09/481,126 filed on Jan. 11, 2000.

TECHNICAL FIELD

The present invention relates to methods of valuing assets and methods of securitizing such assets to facilitate investing therein. In particular, the present invention relates to methods of valuing and repeatedly securitizing multiple intellectual properties and facilitating investments therein.

BACKGROUND

An object of financial transactions is to efficiently relate the valuation and risk of properties created in the course of an enterprise to monetary sums which may be paid for or advanced against such properties. A primary purpose for such transactions is the increase in capital which may be employed to perpetuate further useful enterprises. Two requirements of financial transactions are: (a) a means by which providers of capital may reasonably determine whether to enter into particular financial transactions with holders of properties, and (b) a means for effecting the exchange of capital and property, respectively.

Various computational means exist that constitute prior art for measuring the reasonable market value of financial transactions involving properties owned by an enterprise. In the case of tangible properties and real estate, a principal element of the means has been the existence of a marketplace wherein the payment or advancement of monetary sums for similar properties occurs regularly, is recorded and published, and information is consequently available to participants in other such transactions. This permits a quantification of material terms and conditions for a specific financial transaction based on its similarity or, alternatively, its dissimilarity to prior financial transactions which occurred in a specific marketplace. For example, real estate is often purchased using money borrowed in the form of a mortgage. The lender provides the capital to acquire the property from its current owner in exchange for agreed upon future payments and a security interest in the property. Often, the original lender sells its mortgage rights to a third party for an amount based on the estimated present value of the future payments that the purchaser agrees to make. Similarly, one who owns real estate may obtain capital by selling the real estate to a lender and leasing back the property on specific terms. Mortgages and/or sale/lease back agreements have been packaged and re-sold to third parties as securities. The process by which such a security is created is referred to as "securitization".

The essential elements of such transactions that permit securitization are an assignable agreement having one or more specified future payments backed by rights sufficient to assure the parties purchasing the security that the payments will be made or title to property of similar value can be obtained. In the case of a mortgage, the property interest is title to real estate. In the case of a sale/lease back, the property interest is the right of eviction. In the case of the securitization of intellectual properties, discussed in more detail below, the property interest obtained in the event that the future payments are not made is the right to exclude others from the use of the invention. In each case, the party providing the capital has the ability to acquire a property interest that can be resold to others to provide a return on their original capital investment in the event that the specified future payments are not made according to the agreement.

An increasingly significant object and result of human enterprise is the creation of new and useful knowledge through scientific inquiry and experimentation. Such activities are otherwise known as research and development (hereinafter "R&D"). Between the years 1981 and 1996 various public and private enterprises of the United States expended in the aggregate a sum varying between 2.32% and 2.74% of the annual Gross Domestic Product on R&D. In the calendar year 1995, aggregate U.S. R&D expenditures were computed to be in excess of $183 Billion. A result of R&D expenditures has been the creation of useful and proprietary discoveries, generally called intellectual property. In the practice of accounting, it is well established that intellectual property is "intangible property" that has no intrinsic value per se, but is merely representative of the value of the discovery; this is distinguishable from "tangible property" such as real estate, equipment, business inventories and the like, which can be touched and held.

As an incentive for R&D expenditures, R&D costs are fully deductible as an expense in the year the costs are incurred. Therefore, when R&D expenditures result in intellectual property such as a patent, the "book value" of the patent is zero even though the value to the business may be large. The market value of intellectual property is rarely evaluated because it is generally not sold or otherwise conveyed. Thus there can exist a substantial difference between the market value of intellectual property and its book value. This difference represents an unrecognized capital asset of many businesses.

Heretofore, the intangible quality of intellectual property has been an impediment to the securitization of such assets, frustrating development of financial transactions to capitalize the inherent value of intellectual property. Although, patents and other intellectual property have been sold for capital and security interests in intellectual properties and have been used in the past to obtain capital, no generalized market for such properties has developed. One reason for this is that methods for determining the value to business of an intellectual property have not been made readily available to financial managers. Therefore, expenditures on R&D have tended to consume capital resources of an enterprise due to the unavailability of straightforward securitization methods for any resulting intellectual properties.

Some intellectual properties created as a consequence of R&D possess desirable characteristics that lend themselves to securitization. Patents are one such intellectual property. Patents entitle the owner to exclude others from practicing the invention covered by the patent. Another type of intellectual property is information described in writings and knowledge arising within a business which is: (a) not generally known by others; (b) is retained in secret, and (c) is disclosed to others only under covenants to retain such disclosed intellectual properties secret between and among the parties bound by such covenants (hereinafter referred to as "trade secrets" or "know how"). Copyrights are another form of intellectual property that may be securitized. Copyrights provide an author the right to control reproduction of his intellectual creation, such as literary works, musical works, dramatic works, pictorial works, motion pictures, sound recordings and architectural works.

A characteristic of these intellectual properties is the opportunity afforded to the owners or holders of such intellectual properties to license, lease or otherwise convey rights to use or otherwise practice the useful art, in whole or in part, embodied in such intellectual properties (hereinafter referred to as "licensing").

The securitization of these intellectual properties has not widely occurred due to the lack of a readily available method for determining the market value of intellectual properties and the lack of a marketplace for securities related to intellectual properties. An additional obstacle to the securitization of intellectual properties has been that prior transactions have not constituted the type of transaction subject to the favorable tax treatments associated with a sale. Prior transactions have typically involved a sale and license arrangement where future payments are related to future sales of the goods or services covered by the intellectual property. In such a transaction, the future payments are not fixed or readily predictable. Therefore, the current value at any given time of such an agreement is difficult to quantify without substantial analytical effort.

SUMMARY

An object of the present invention is to provide a means whereby holders or owners of proprietary intellectual property may readily determine the value to the business of the securitization of some or all of their intellectual property and obtain capital by securitizing those intellectual properties. A further object of the invention is to provide a method of securitizing intellectual property that can have the tax treatment of a sale and has predictable future payments which permits ready valuation of the current value of the security at any time.

A further object of the present invention is to provide a means to relate the valuations and risks associated with different intellectual property assets to each other and to other securitized financial transactions.

A still further object of the present invention is to provide a means by which providers of capital may aggregate and convey capital, and holders of intellectual property assets may convey those assets, singly or in a group, in exchange for said capital.

Another object of the present invention is to permit repeated securitization of multiple intellectual property assets and facilitate investments that are not specifically tied to individual underlying securitizing transactions, and are not time-dependent upon those securitizing transactions.

The aforementioned means shall also provide for the allocation of and accounting for equitable interests, income, and liabilities by and among the respective parties. Collectively, the means contemplated by the present invention are embodied in certain novel software, flowcharts and computational algorithms that separately and collectively constitute the devices and utilities to accomplish the aforementioned objects of the present invention.

Another novelty disclosed by this invention is the securitization of intellectual property assets through the concurrent or sequential exchange of rights in possession with rights in use which appends to the underlying financial transaction. A further novelty disclosed in the present invention is permitting the collection of investments from multiple investors, continuously evaluating the real-time value of the underlying intellectual property assets, and permitting individual investors to change their investment amount or withdraw invested funds without requiring the underlying transaction to occur simultaneously with such change in investment.

A still further novelty disclosed by this invention is the creation of a legal entity required to hold the interests of the investors' rights in conveyed intellectual properties in order to perfect and enforce such rights.

It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

GENERAL DESCRIPTION OF THE INVENTION

The essential elements of the method of securitizing an intellectual property include transferring title to one or more intellectual property from the initial owner to one or more subsequent owners, or to a pool of ownership, and the grant back to the initial owner and/or other persons of a license to use the intellectual property, which requires one or more fixed future payments by the licensees in exchange for the licensing rights granted. The scope of the license granted may be a nonexclusive license, which permits additional licensing by the subsequent owner, or an exclusive license limited to a field of use less than the entire scope of possible use of the intellectual property. The payments from the persons granted a license can even be assigned, in whole or part, to third parties.

The Invention Includes a Unique Method of Securitizing an Intellectual Property.

To securitize an intellectual property, the entities acquiring the intellectual property must become the true owner of the intellectual property so that the tax treatment associated with the sale of a capital asset can be achieved by the entity selling the asset. Further, the acquiring entities may need to obtain investment capital to pay for the acquisition of the intellectual properties using recognized financial transactions. Therefore, the method of securitizing an intellectual property described herein includes related but separate financial transactions: (1) the true transfer of title to one or more intellectual properties, (2) an assignable investment instrument, (3) a system of obtaining payments from the licensee(s) of the intellectual property and placing those payments into one or more funds, and (4) allocating payments from the funds to more than one investor, in varying proportions.

The method of allocating payments to each respective one of multiple investors includes the steps of: (a) creating and identifying investor accounts, (b) obtaining an initial amount from an investor in exchange for an assignable agreement to allocate a proportionate amount of future income to the investors, (c) associating said initial amount from an investor with that investor's account, (d) for each intellectual property to be securitized, identifying the initial owner of said intellectual property, (e) paying an amount to said initial owner of said intellectual property upon the transfer of title to said intellectual property from said initial owner to one or more subsequent owners, (f) granting a license to said initial owner and/or other entities for the use of the invention covered by the intellectual property from said subsequent owner(s) in exchange for an agreement by said initial owner and/or other entity to make at least one payment in a predetermined amount at a specified time for the grant of such license, wherein said licenses can be of varying scope as to rights granted or fields of use, (g) obtaining at least one payment from said licensee(s) of said intellectual property, (h) placing said at least one payment into a fund established for the purpose of receiving such funds, (i) allocating said at least one payment from said fund to the respective investor account(s) in correct proportions, (j) wherein each investor may assign his/her right to receive payment to a third party.

The method may also be applied in the situation where a particular intellectual property is already licensed to a user other than the owner prior to securitization of the intellectual property. In such case, the intellectual property may be acquired from the current owner, subject to the existing license obligation, so long as the existing license is consistent with the method disclosed herein. Alternatively, the method described herein may be applied independently of such license, so long as the license back to the initial owner is broad enough to encompass the existing license. Thus, the method would not be directly applicable in the situation where an intellectual property owner had granted an exclusive license of all the rights granted by the intellectual property unless the licensee also participated and agreed to enter a new license in accordance with the method disclosed herein.

Although the method can be applied in the situation where there is only one investor, a much more typical situation will involve multiple investors. In that situation, each investor has a separate account and can separately sell their interest, or a portion thereof, to subsequent investors or redeem their interest or a portion thereof for cash payments. Therefore, the system must be able to create and track multiple investor accounts.

The Invention Includes a Method of Determining a Change in Value of an Intellectual Property.

To effectively securitize an intellectual property, an economically reasonable estimate of the current value of the intellectual property must be obtained. Further, the ability to demonstrate to a current owner the value of an intellectual property for which the owner is seeking securitization is useful. While numerous methods of estimating the value of one or more intellectual properties are known, the invention disclosed herein includes a method of combining an estimate of the value of an intellectual property with an assessment of the impact on the value of the selling business of securitizing that intellectual property. This method comprises entering information related to at least one intellectual property, calculating a value of the at least one intellectual property using a first valuation algorithm, selecting a second valuation algorithm having a plurality of inputs, inputting the value of at least one intellectual property into the second valuation algorithm, inputting at least one additional piece of information required by the second valuation algorithm, and calculating the change in value to the owner of the intellectual property using the second valuation algorithm. The method may further comprise inputting an identifier indicative of a utility of the intellectual property by selecting from a list including such options as: "new product category," "improvement on an existing product," "a new process," "an improvement on an existing process," and "regulatory compliance." The method may further comprise selecting a first valuation algorithm from a plurality of valuation algorithms by selecting a first valuation algorithm particular to the type of utility associated with the intellectual property. The method may further comprise entering information on the financial characteristics of the owner not directly related to the intellectual property.

Method of Calculating the Change in Value of an Owner of Intellectual Property upon Entering a Securitizing Agreement.

The present invention includes a method to determine the securitizable value of an intellectual property, and whether the owner of the intellectual property will be benefited by securitizing the intellectual property.

Identifying an Intellectual Property.

In order to begin the process, at least one intellectual property must be identified. Generally, an owner that wishes to securitize some portion of its intellectual property portfolio will identify all intellectual properties it owns, and determine which ones it wishes to have analyzed for securitization. Often, an owner will want to securitize all the intellectual properties it owns that relate to a particular product line or business activity. The intellectual property portfolio may even contain intellectual properties owned by third parties, so long as the owner seeking securitization has exclusive rights in such third party intellectual properties, and the right to convey such exclusive rights to others. Once an intellectual property portfolio is specifically identified, for the purposes of the method, the portfolio, and each component thereof, is given an identifier for tracking purposes.

Entering Information Related to the Intellectual Property Estate.

Once a particular intellectual property portfolio is identified, its current value must be determined to an acceptable degree of accuracy for purposes of securitization. The number of different approaches to determining value of the intellectual property estate is virtually limitless, and different methods will produce different estimated values. (See, for example, *Licensing Law Handbook* (Clark Boardman Co., 1982)).

Typical information used for the valuation method of this invention includes, but is not limited to: current and projected future revenues and costs of the goods covered by the intellectual property, cost savings attributable to an invention covered by an intellectual property, the book value of the business activities associated with the intellectual property, and ongoing expenditures for marketing, research and development. It is difficult to calculate a value for an intellectual property not associated with any current or ongoing revenue or costs.

The particular valuation algorithm will necessarily determine what information must be obtained and entered for the valuation to be completed. For example, when making a valuation for an environmental control invention that permits a business to continue operation under regulatory requirements, the evaluation should take into consideration the ongoing revenue generated by the continuation of the business. In addition to financial information, information such as the remaining life of the patent may be used by the first valuation algorithm.

Determining a Value of the Intellectual Property Using a First Valuation Algorithm.

Once the appropriate first valuation algorithm has been determined for each intellectual property within a portfolio, the current value of the portfolio is determined using the appropriate algorithms. Selecting an appropriate second valuation algorithm.

Determining whether an owner should securitize its selected intellectual property portfolio, or a portion thereof, will depend on a number of factors in addition to the estimated value of the intellectual property portfolio. Therefore, the second valuation algorithm should have at least one other input in addition to the valuation of the intellectual property portfolio obtained from the first algorithm. For example, an owner would typically not want to securitize its intellectual property portfolio if the original owner would have to make a future payment stream to the securitizing party that was greater than the owner's return on equity. Therefore, in addition to determining the current value of the intellectual property portfolio, the change in value to the original owner of the intellectual property portfolio would be considered when selecting a second valuation algorithm.

Entering the Value of the Intellectual Property Portfolio into the Second Valuation Algorithm.

Although not dispositive, the current value of the intellectual property portfolio can be used as a starting point to determine the value at which the portfolio could be securitized. Therefore, the estimated current value is a critical piece of information used by a second valuation algorithm.

Entering Additional Information Required by the Second Valuation Algorithm.

Once the appropriate second valuation algorithm is selected, the appropriate information is collected and entered. For example, securitization will typically involve an exchange of the intellectual property portfolio for a lump sum payment to the original owner and, often, an agreement to make future payments to the owner. The future value to the original owner of the net proceeds of the lump sum amount should also be considered in the second valuation algorithm. One measure of the future value of the net proceeds of the lump sum payment to the original owner is the current return on equity. Other measures, such as money market rates or the prime rate, may also be used.

Using the Second Valuation Algorithm to Determine a Change in the Current Value of the Owner of the Intellectual Property.

The second valuation algorithm will determine the change in value of the original owner if the intellectual property portfolio is securitized, versus the value of the original owner if the portfolio is not securitized. This outcome will be used to decide whether to securitize the intellectual property portfolio. If the value is positive, the business will show an increase in value in that amount if the intellectual property portfolio is securitized. Once a positive change in the value of the business based on this calculation has been determined, the intellectual property portfolio will probably be securitized for an amount related to, but not identical to, the estimated current value. For example, if the estimated current value is $370,180,000, the portfolio may be securitized for $350,000,000, $370,000,000, or other amounts in a similar or lesser range, but would probably not be securitized for an amount of $500,000,000.

The Method of Establishing a Marketplace for Securitized Intellectual Property.

To permit the management of a portfolio of securitized patents with the ability to include new investors and permit existing investors to transfer or withdraw their interests, a computer system is necessary. The system must be capable of handling multiple intellectual property portfolios, multiple investor accounts and the numerous transactions whereby investor interests in the various intellectual property portfolios are made, changed, or terminated. Additionally, the system must be capable of handling repeated securitization of multiple intellectual property assets and facilitate investments that are not time-dependent upon or specifically tied to individual underlying securitizing transactions.

Specifically, a system which permits the collection of investments from multiple investors, the real-time continuous evaluation of the value of the underlying intellectual property assets, and which permits individual investors to increase their investment or to withdraw invested funds without requiring the underlying transaction to occur simultaneously with such change in investment is necessary for the ready securitization of intellectual property assets.

Such a system would have the following general attributes, not all of which are essential: it would involve more than one underlying intellectual property securitizing transaction; it would permit one or more investors to invest funds in the system, where such investment was not associated with any particular intellectual property securitizing transaction; it would include the availability of funds not invested in intellectual property assets for cash withdrawal, if needed; it would permit the securitizing of additional intellectual property assets using existing investment funds, rather than requiring additional investment for the new intellectual property to be securitized; it would permit each individual investor's current investment to be evaluated on a regular basis; and would permit individual investors to withdraw funds independent of specific securitizing transactions.

Therefore, the method of establishing a marketplace for securitized intellectual property includes a data processing system for managing the transfer and allocation of monetary funds between a portfolio of investor accounts, a general trust account and a portfolio of intellectual properties, the system comprising:

a) a data recording system comprising at least one data recording device;

b) creating in the data recording system a unique account for each respective investor account;

c) creating in the data recording system at least one general trust account not associated with a specific investor;

d) indicating in the data recording system that a predetermined quantity of the funds from the general trust account are transferred to the initial owner of an intellectual property in exchange for title being transferred to a subsequent owner;

e) indicating in the data recording system a grant back to the initial owner of the intellectual property a license to use the intellectual property;

f) recording in the data recording system the licensing agreement entered into for each specific intellectual property, the amount of the royalty payment(s) to be received from the licensee, and the date each payment is due;

g) recording in the data recording system royalty payments made from the licensee in the general trust account;

h) allocating in the data recording system payments from the general trust account to any investor accounts; and i) deducting in the data recording system each payment to investor accounts from the general trust account.

The system may further comprise a computer processor for processing data; wherein the data recording system has a data disk operatively connected to the computer processor means.

The system may further comprise means for processing on the recording means data regarding the transfer and allocation of monetary funds among and between various accounts.

The system may further comprise means for initializing the data recording system to magnetically store selected data regarding the crediting and transfer of funds and payments to and from the various accounts.

The system may further comprise a data recording system which comprises at least one sheet of paper and means for transcribing data thereon.

The system may further comprise a system wherein the license to use an intellectual property is an exclusive right to use the intellectual property for the term of the license.

The system may further comprise means for accessing information on the data recording system from another data processing system, by means of a modem.

The system may further comprise means for accessing information on the data recording system from another data processing system, by means of the world wide web.

The system may further comprise a system wherein the predetermined quantity of the funds represents the future value of the portfolio of one or more intellectual properties discounted by a predetermined interest rate applied over a period of time extending to the time at which the future value is represented.

The system may further comprise a system wherein the portfolio also includes at least one security instrument.

The system may further comprise a system wherein the portfolio also includes a money market account.

The system may further comprise a method for assigning a risk factor to each intellectual property, based on a variety of factors, each intellectual property, or portfolio of intellectual properties being assigned a level of risk indicating low to high risk.

The system may further comprise recording an allocation, selected by each respective investor, to that investor's account, used to allocate the funds of the respective investor between low risk intellectual properties and high risk intellectual properties.

Another embodiment of the system additionally includes a data processing system for managing the transfer and allocation of funds between portfolios of intellectual properties, funds within the system, and investor accounts, the system further comprising:

(a) a computer processor device for processing data;

(b) a storage device operatively connected to the computer processor device for storing data;

(c) creating in the storage device a unique account for each respective investor account, such device being capable of associating a variety of information about the account with the unique account identified, including information about the funds received to be related to the investor account;

(d) creating in the storage device at least one general trust account not associated with a specific investor into which funds can be placed and removed;

(e) indicating in the storage device that a predetermined quantity of the funds from the general trust account are transferred to the initial owner of an intellectual in exchange for title to the intellectual property being transferred to a subsequent owner;

(f) indicating in the storage device a grant back to the initial owner of a license to a specific intellectual property;

(g) recording in the storage device the licensing agreement entered into with respect to each specific intellectual property, the amount of royalty payment(s) to be received from the licensee, and the date each payment is due;

(h) indicating in the storage device that at least one payment is made from the licensee into the general trust account;

(i) allocating in the storage device payments from the general trust account to investor accounts; and (j) deducting in the storage device each payment to investor accounts from the general trust account.

The system may further comprise allocating on the storage device to each investor account a percentage share that investor account holds relative to each intellectual property, such percentage being calculated based on a variety of factors, including the amount invested, amount of risk to be taken, and time duration for the investor account to hold the percentage share.

The system may further comprise a system wherein the storage device is a data disk.

The system may further comprise initializing the storage device to magnetically store selected data regarding the crediting and transfer of funds and payments to and from the various accounts.

The system may further comprise a system wherein the licensing agreement for a specific intellectual property grants an exclusive right to use the intellectual property for the term of licensing agreement.

The system may further comprise accessing information on the storage device from another data processing system, by means of a modem.

The system may further comprise accessing information on the storage device from another data processing system, by means of the world wide web.

The system may further comprise a system wherein the predetermined quantity of the funds represents the future value of a portfolio discounted by a predetermined interest rate applied over a period of time extending to the time at which the future value is represented.

The system may further comprise a system wherein the portfolio also includes at least one security instrument.

The system may further comprise a system wherein the portfolio also includes a money market account.

The system may further comprise a method for assigning a risk factor to each intellectual property, based on a variety of factors, each intellectual property, or portfolio of intellectual properties being assigned a level of risk indicating low to high risk.

The system may further comprise storing an allocation, selected by each respective investor, to that investor's account, used to allocate the funds of the respective investor between low risk intellectual properties and high risk intellectual properties.

Another embodiment of the system is a method for managing a plurality of financial transactions involving securitized intellectual property, which includes, for each financial transaction, generating a securitized transaction record when a particular intellectual property portfolio is securitized, and including in the securitization transaction record:

a) an indicator of the intellectual property portfolio being securitized;

b) an indicator identifying one or more investors participating in the securitizing transaction;

c) an indicator of the amount paid for the intellectual property portfolio securitized;

d) an indicator of the rights granted back to the initial owner of the intellectual property portfolio being securitized;

e) an indicator of the payment obligation of the intitial owner of the intellectual property portfolio being securitized; and f) an indicator of the allocation of such payments to one or more investors in the particular securitization transaction.

The method may be a linear, stacked system, or a distributed database with pointers to other databases from within a particular database.

BRIEF DESCRIPTION OF THE DRAWINGS

For a more complete understanding of the present invention, and the advantages thereof, reference is now made to the following descriptions taken in conjunction with the accompanying drawings, in which:

FIG. A is a general flowchart view of the portions of the computational devices that respectively provide:
(1) valuations for patented intellectual properties and
(2) investment criteria database and evaluation of an enterprise's pre-existing financial condition.

FIG. B is a continuation of FIG. A's flowchart view of the computational devices which further provides for optimization and selection of transaction parameters following from the valuation investment criteria portions of the flowcharts.

FIG. C is a continuation of FIG. B's flowchart view of the decision tree and related computational devices to create transaction documents for execution, or modify boundary conditions for valuation and financial computations, or to proceed to a new investor, investor entity or intellectual property, respectively.

FIG. D is a general flowchart view of the formation of an investment entity for the pooling of investment capital, acquisition of patent estates, collection of revenues and distribution of funds, revenues, proceeds and interests among parties of the investment entity and whose inputs are received from the outputs of the FIG. C. flowchart.

DETAILED DESCRIPTION OF THE PREFERRED EMBODIMENT

A preferred embodiment of the invention for securitization of patents is illustrated in FIGS. A, B, C, and D as follows:

1. In FIG. A at 1A information obtained from the Patent Holder [1] about an Intellectual Property [2] available for valuation and securitization is input into Computer Program
2. Patent Data [3–6] is accessed from patent documents or data transmitted electronically (facsimile or internet access among other methods) including but not limited to; patent number, date of issue, claims, citations, inventors, assignees, and cross references and entered into Computer Program [7]. If the intellectual property is a property other than a patent, similar data pertaining to that intellectual property is entered into Computer Program [7].
3. Computer Program [7] prompts the program user at decision point [8] to declare ownership status of the Intellectual Property [2]. A negative input at [8] prompts decision point [9] to determine assumption of legal liabilities by Holder [1] pursuant to a securitization of Intellectual Property [2]. A negative input at [9] terminates the processing of Intellectual Property [2] by Program [7] and prompts the user for a new Intellectual Property [2'] at decision input [10] from Holder [1] into Program [7]. A negative input at [10] prompts user to enter a new Intellectual Property Holder [1'] at 1A on FIG. A.
4. A positive response at [8] or [9] prompts Performance Data sub program [11] to engage a plurality of decision points [12–14] to select utility of Intellectual Property [2] to Holder [1]. Decision points [12–14] determine whether Intellectual Property [2] constitutes an invention or improvement of a product, process, or compliance of a product or process to regulatory standards, among other factors. An affirmative input at a particular decision point [12–14] engages an algorithm with a function scalar≠0 within sub program [15] of Program [7]. The algorithm derives from a database of applicable algorithms for a particular decision point [12–14]. A negative input at all decision points exits sub program [11] and prompts decision point [10].
5. Sub-program [15] prompts the user to input accounting and business data at inputs [16–19] that relate to Intellectual Property [2]. Such inputs may include, without limitation: [16] historical and current accounting data related to revenues, direct and indirect costs, balance sheets, and associated cash flows; [17] forecasts of future accounting data; [18] risk algorithms applicable to [17]; and [19] R&D and continuing development costs for Intellectual Property [2].
6. Sub-program [15] performs a computational analysis which compares data inputs from [16–19] to data computed from assuming non-existence of Intellectual Property [2].
7. A decision point [20] performs a difference analysis of the output of Steps 5 and 6 previous to determine Intellectual Property [2] marginal value. For marginal value>0 sub-program [15] inputs Intellectual Property [2] data to sub-program [21] to perform valuation modeling. For marginal value≦0 the program prompts [10].
8. The prompt of sub-program [21] concurrently prompts inputs [22–25] relating (without limitation) to the proprietary life and uncertainty risks associated with Intellectual Property [2]. Inputs [22–25] may consist of, without limitation: [22] economic life; [23] legal life (may include input of [4]); [24] technology risk obsolescence (may include inputs [5,6] and selection of algorithm contained within database [40]); and [25] valuation risk by means of selection of algorithms in database [40] or direct input. Sub-program [21] compares inputs [22–25] to valuation data array database [40] at 1B which comprises accumulative data on a plurality of patents from a plurality of holders.
9. Sub-program [21] performs a series of patent valuation optimization computations [26] detailed at 2A on FIG B.
10. Holder's [1] input of Holder's financial description [27] into Program [28] on FIG. A may constitute a separate program or a linked program to Program [7]. The program link occurs at [20] where marginal value >0 and inputs to decision point [29] to characterize a transaction as "on" or "off" balance sheet. "On" balance sheet transactions prompt sub program [30] to compute algorithms for patent [2] valuations based on changes made to balance sheets. "Off" balance sheet transactions input data at outputs [20] and/or [28] directly into financial model sub-program [31]. The terms "on balance sheet" and "off balance sheet", as used in this document, have the meaning assigned to those terms in the Generally Accepted Accounting Principles (GAAP).
11. Sub-program [31] receives inputs alternatively from decision point [29], sub-program [30] or database [50] at 1C. Database [50] may receive and accumulate Investor investment parameters [32] at iD on FIG. A.

Sub-program [31] uses computational algorithms to initialize financial optimizations at [33] and detailed at 2B on FIG. B.

12. Output from [31] is accumulated in database [50] for future reference, and standardization and normalization of financial computations.
13. The Valuation scenario sub-program at [26] connects at 2A on FIG. B. At [34], the user is prompted by a decision point to set valuation boundary conditions. The valuation boundary conditions may include, without limitation, alternative inputs to inputs [16–19, 22–25]. An affirmative response at [34] prompts input [35] for boundary conditions $\{N_i\}$ and $\{N_f\}$ for various alternative inputs.
14. Inputs at [35] initialize sub-program [36] which dimensions Valuation Model $\{N_x\}$. A negative response at [34] directly inputs outputs from [26] into sub-program [36].
15. Valuation Model sub-program [36] enters a subroutine [37] which performs a "do loop" maximum/minimum iteration sub-program [38] for each $\{N_x\}$. The output at [38] queues Valuation Data array [39] and inserts and/or compares data output to Valuation Data Base [40].
16. An optimization of Valuation Model $\{N\}$ and Financial Model $\{M\}$ is performed at sub program [41] Such optimization methods may include without limitation: maximization of $\{N\}$ and $\{M\}$, arithmetic manipulations thereof, relative ranking, or topological analysis. The output of the optimization is held at [42] pending next selection of $\{N\}$ boundary conditions at [43] which enters subroutine [37].
17. The Financial scenario sub-program at [33] connects at 2B on FIG. B. At [44] the user is prompted by a decision point to set financial boundary conditions. The financial boundary conditions include, without limitation: financial performance conditions such as net present value, discounted cash flow, and minimum or maximum investment increments. An affirmative response at [44] prompts input at [45] to set financial boundary conditions $\{M_i\}$ and $\{M_f\}$.
18. Inputs at [45] initialize sub-program [46] which dimensions Financial Model $\{M_x\}$. A negative response at [44] directly enters outputs at [33] in sub-program [46].
19. Financial Model sub-program [46] enters a subroutine [47] which performs a "do loop" maximum/minimum iteration sub-program [48] for each $\{M_x\}$. The output at [48] queues Financial Data Array [49] and inserts and/or compares data output to Financial Data Base [50] at 1C.
20. An optimization of Valuation Model $\{N\}$ and Financial Model $\{M\}$ is performed at sub-program [41]. Such optimization methods may include without limitation: maximization of $\{N\}$ and $\{M\}$, arithmetic manipulations thereof, relative ranking, or topological analysis. Output is held at [51] pending next selection of $\{M\}$ boundary conditions at [52] which enters subroutine [47].
21. A plot and/or sort of data held at [42] identifies $(\{N_{Max}\}$ vs. M).
22. A plot and/or sort of data held at [51] identifies $(\{M_{Max}\}$ vs. N).
23. At decision point [53] the intersection of $\{Plot\ N_{Max}\}$ determined at [42] with $\{Plot\ M_{Max}\}$ determined at [51] $\{Plot\ N_{Max} \cap Plot\ M_{Max}\}$ is evaluated. An intersection resulting in a Null set is deemed negative which prompts decision point [63]. An intersection≠Null set is deemed affirmative and prompts selection of M and N at [54], and is further described starting in step 25, below.
24. A negative decision at [53] prompts decision points [63] and [64], which perform an analysis to determine whether to reset boundary conditions $\{N_i\}$, $\{N_f\}$ and $\{M_i\}$, $\{M_f\}$ at 2A and 2B. If not, the program proceeds to decision point [62], and the user is prompted to enter information about the next activity.
25. At selection point [54] the user is prompted to select the optimal values for M and N. The inputs at [54] prompts the preparation of documents [55] to effect a transaction. Documents may be electronically drawn from a document database [56] or directly input by the user at [57].
26. Decision points [58] and [59] require acceptance of the documents [55] by the owner of the intellectual property and the investor, respectively. If not, the program proceeds to decision point [60], and the user is prompted to determine whether the parties will consider accepting a set of terms other than those specified in the document created at [55]. If so, the user is prompted to prepare revised documents at [55]. If not, the program proceeds to decision point [62], and the user is prompted to enter information about the next activity.
27. When documents [55] are created that are accepted by the owner of the intellectual property and the investor, the program proceeds to the pooling trust sub-program [61]. Pooling trust sub-program [61] performs a series of pooling computations detailed at 2C on FIG. D.
28. The pooling trust sub-program [61] commences with a prompt that allows the user to choose activities for the IP Investment Trust [66], the IP Holder [73], or a For/Next Investment Loop [80].
29. The IP Investment Trust commences with the conveyance of the intellectual property(s) and title thereto at [66] from the original owner[73] into the intellectual property investment trust at [67] in exchange for capital and a license back for certain rights in the intellectual property [68]. The Investment Trust [67] is a legal entity formed for the purpose of these transactions.
30. At specified times during the term of the license, the original owner [73] of the intellectual property pays a specified or variable royalty into the investment trust [67] at [70].
31. If the investment trust [67] licenses the intellectual property to an additional party, the licensee [69] of the intellectual property receives a license back for a specified term [71] for certain rights in the intellectual property that are less than all the rights.
32. At specified times during the term of the license, the licensee [69] of the intellectual property pays a specified or variable royalty into the investment trust [67] at [70].
33. For each intellectual property offered to the pooling trust at [72], an evaluation of the intellectual property must be performed, starting at 1A on FIG. A.
34. Each investor [80] conveys the desired amount of cash into the investment trust [67] at [81]. The Investment Trust [67] is a legal entity formed for the purpose of these transactions.
35. In consideration for the conveyance of cash at [81] into the investment trust [67], the investor [81] will receive payments at specified times during the term of his/her in the trust at [75].

36. Alternatively, the investor [81] can designate a beneficiary [77] to receive his/her payments from the investment trust[67] for all or a portion of the term of investor's investment.
37. At [76], the program computes the amount of payment to be made to the investor [81] or beneficiary [77] during the term of his/her investment.
38. For each investor in the pooling trust at [79], an evaluation of the investor investment parameters must be performed, starting at 1D on FIG. A.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

SPECIFIC EXAMPLE

Example 1-A

Securitization of an Intellectual Property

Company T decides to securitize a patent it owns, which is identified as Patent A. Patent A is a U.S. patent which covers the composition of matter of a pharmaceutical substance α which is used in the treatment of a human health disorder H. The following information is known about Patent A, product α, and the marketplace for health disorder H:

(a) The unexpired life of Patent A is 10 years (*Remaining Patent Life, RPL*); Input 23 to sub-program 21
(b) Company T is the assignee of the entire interest in Patent A.
(c) There are no legal actions pending against Company T with respects to the validity or enforceability of Patent A.
(d) Company T spent $1,000,000 to research and develop the technology covered by Patent A which Company T expensed in the years in which the research was conducted. $1,000,000=AG21. This information should be used in the calculation only if there has been no revenue stream (IREV) generated by the technology that can be used in the calculations. If IREV>0, set AG21=0.
(e) The sales of product α are $25 million per year in the United States (IREV). The economic life of α, absent foreseeable technological replacements, will significantly exceed 10 years.
(f) Sales of product α have grown steadily at 10% per year {RVGR=IF ((I1*G1−IREV)/G1<RVGR, RVGR=H1, RVGR)} in the previous five years.
(g) The value of all products and services currently used to treat disorder H in the U.S. is $30 million per year. (G1)
(h) The incidence of H is increasing 3% per year in the United States (H1).
(i) Approximately 90% of persons suffering from H respond favorably to treatment by α which is also the lowest cost form of treatment for H. (I1)

(j) The materials, manufacturing overhead, sales, administrative and continuing R&D costs associated with α as a percent of sales revenues are:

| | |
|---|---|
| Sales Revenues | 100% |
| Materials | 20% = MTL |
| Manufacturing Overhead | 10% = MFGOH |
| Gross Margin | 70% |
| Sales | 15% = SALESEXP |
| Administration | 10% = ADMN |
| Continuing R&D | 5% = R&DEXP |
| Operating Margin | 40% |

(k) Company T is taxed at the rate of 35% for ordinary income and capital gains income respectively (XTAXRATE=XCGR). For simplicity in this example, the rates are assumed to be the same.
(l) The financial method of analysis used by Company T are return on equity ("ROE") and net present value ("NPV"). The ROE for T is 15% per year(XROE) and the NPV discount factor is 6% per year(XNPVDF).
(m) For purposes of this Example, inflation and changes in manufacturing cost are both respectively set at 0% per year for the unexpired life of Patent A (XINFLRATE).
(n) Compound α also expresses useful biological activity suitable for animal health applications. For purposes of this Example, the contingent economic benefit that could result from application of α to animal health markets is discounted to zero.

In Example 1-A, a first valuation algorithm is employed using inputs disclosed in (a)-(k) and (m) to determine the remaining value of Patent A to Company T. The preferred first valuation algorithm is more particularly described in "Preferred Embodiment of the Invention". The first valuation algorithm determines that existing business activity obviates the application of prior R&D expenditures recited in (d) to the computation of value for A.

The sales growth portion of the algorithm for compound α modifies the historical growth recited in (f) to account for the market limits for H recited in (g) and (h) and the available portion of market H to compound α which is recited in (i).

The first valuation algorithm determines apportionment of Patent A value in each subsequent accounting period as a fraction of the operating margin or gross margin, respectively, depending on the specific utility of A and the dependent requirements of business functions other than A to sustain the sales of α.

With respect to R&D, the first valuation algorithm takes into account whether such expenditures constitute a continuing technical maintenance cost required for sales of α or whether such expenditures relate to investments in new technology development unrelated to the current market and sales of α.

For a Patent A having all the technical characteristics previously recited, and for a market H, product α and Company T having the business characteristics previously recited, the gross value of Patent A for its unexpired patent life can be reasonably computed to be $50.87 million.

The specific computations and algorithms utilized to determine the gross value of Patent A above are recited below:

(1) Calculation of Book Value of business in which Patent A is employed:

Net Profit For Year $N=(IREV*(1+RVGR)^{(N-1)}-IREV*(MTL+MFGOH+SALESEXP+ADMN+R\&D)*(1+XINFLRATE)^{(N-1)})*(1-XTAXRATE)/(1+XNPVDF)^{(N-1)}=NP(N)$ By making the numerical substitutions set forth above, the numerical results are:

| | | |
|---|---|---|
| IREV = | $25.0 | (Millions/Year) |
| RVCR = | 3.0 | (Annual Growth) |
| MTL = | 20% | (Material Cost as % Sales) |
| MFGOH = | 10% | (Mfg Overhead as % Sales) |
| SALESEXP= | 15% | (Sales Cost as % Sales) |
| ADMN = | 10% | (Administration as % Sales) |
| R&DEXP= | 5% | (Continuing R&D on α as % Sales) |
| XINFLRATE = | 0% | (Inflation %/year) |
| XTAXRATE = | 35% | (Ordinary Income Tax Rate % Taxable Business Income/year) |
| XNPVDF = | 6% | (Discount Factor, %/year) |

(i) The resulting outputs are:

| N (Year) | 1 | 2 | 3 | 4 | 5 | 6 | 7 | 8 | 9 | 10 |
|---|---|---|---|---|---|---|---|---|---|---|
| NP (N) (Mil $) | $6.5 | $6.6 | $6.7 | $6.7 | $6.8 | $6.8 | $6.8 | $6.8 | $6.8 | $6.8 |

(ii) Book Value=Adjustment to Net Profit for NPV and ROE FOR N=1, N=RPL−1), (XBPROE*NP (N)) /XBPNPVDF+NP(N+1): (XBPROE*NP(RPL−1))/XBPNPVDF+NP(RPL)=BOOK
where
    XBPROE=1+XROE and
    XBPNPVDF=1+XNPVDF By making the numerical substitutions set forth in Example 1-A, the numerical results are:

For XROE=15% (Return on Equity %/year)
    XBPROE=1.15
    XNPVDF=6% (Net Present Value Discount %/year)
    XBPNPVDF=1.06 and

| N (Year) | 1 | 2 | 3 | 4 | 5 | 6 | 7 | 8 | 9 | 10 |
|---|---|---|---|---|---|---|---|---|---|---|
| NP (N) (Mil $) | $6.5 | $6.6 | $6.7 | $6.7 | $6.8 | $6.8 | $6.8 | $6.8 | $6.8 | $6.8 |

The resulting output is BOOK=$99.37 million.

The output variable BOOK reflects the expected increase in business value for Company T that results solely from the profits and assumed re-investment of profits derived from the sale and manufacture of α during the remaining patent life of "A". Such calculations are recognized as useful measures of future business value.

(2) Calculation of Fractional Business Value and Present Value Attributable to Patent A Technology:
  (i) Technology Fraction(TECHFRAC)= XMFGSAV*XMFGCOST+LNWPR*(1−XMFGCOST−SALESEXP)*(ADMN+R&DEXP) /(SALESEXP+ADMN+R&DEXP)+LREG*(1−(XMFGCOST+SALESEXP+ADMN+R&DEXP−XREGCOST))*R&DEXP/(XREGCOST+R&DEXP)
  Where XMFGSAV=Manufacturing Savings %=0 LNWPR=IF(New Product, 1,0)=1 LREG=IF(Required by Regulation, 1,0)= 0XREGCOST=Regulatory Costs %=0 XMFGCOST=MTL+MFGOH=Manufacturing Costs=30%

By making the additional numerical substitutions set forth above, the numerical results are:
For
    SALESEXP=15% (Sales Cost as % Sales)
    ADMN=10% (Administration as % Sales)
    R&DEXP=5% (Continuing R&D on α as % Sales)
    The resulting output is TECHFRAC=0.275=27.5%.

The output variable TECHFRAC is an empirical coefficient which can be employed in a successive algorithm to attribute a cash value that is contributed by a technology to a business in a discrete time period. The TECHFRAC algorithm reflects the fractional contribution that technology makes to the total value of a business which may be compared to fractional values contributed by other business functions. Such calculations represent an improvement over prior efforts to estimate technology value as either all or none of the profits of a business. The TECHFRAC algorithm anticipates that useful technologies have discrete and distinguishable means for contributing value as a function of the technological novelty.
  (i) Technology Present Value=SUM ((TECHFRAC*IREV*(1+RVGR) ^(N−1)− R&DEXP*IREV*(1+XINFLRATE)^(N−1))/XBPNPVDF^(N−1): (TECHFRAC* IREV*(1+RVGR) ^(RPL−1)−R&DEXP*IREV*(1+XINFLRATE)^ (RPL−1))/XBPNPVDF^(RPL−1))=TECHVALUE By making the numerical substitutions set forth above, the numerical results are:
For
    IREV=$25.0 (Millions/Year)
    RVGR=3.0% (Annual Growth)
    R&DEXP=5% (Continuing R&D on α as % Sales)
    XINFLRATE=0% (Inflation %/year)
    N=Years 1 to RPL
    RPL=10 Years
    XBPNPVDF=1.06 Net Present Value Discount
    TECHFRAC=27.5%
    The resulting output is TECHVALUE=$50.87 Million.

The output variable TECHVALUE is a current valuation of Patent A as a property asset whose value is the sum of its income contribution due to its technological novelty over its unexpired patent life and divided by a net present value denominator for future expected income. Income contribution computed by multiplying TECHFRAC and future expected annual sales is reduced to the extent future R&D expenditures are made to maintain the utility of Patent A. The TECHVALUE algorithm is a novel and useful method to determine the internal value of an intellectual property to a business that owns and utilizes such an intellectual property. TECHVALUE is novel in that it creates a computed economic value that a prospective purchaser of such a technology may utilize to determine whether such a purchase price is supported by the business currently using it. A further novelty is that TECHVALUE does not require a pre-existing market for technologies similar to Patent A to compute a value that reasonably represents a maximum appraisal value that is supportable by the business presently using Patent A.

Such valuation computed by the enumerated algorithms set forth in this Example 1 does not preclude the computation of alternative values as a result of alternative inputs in (a)–(n). Further, the computation does not preclude the use of the algorithms to compute the reasonable fair value that can be attributed to various contingent applications of A for businesses not yet in existence but foreseeable prior to the unexpired life of A. The computation does not preclude the use of statistical variations or processes to manipulate the inputs into the valuation algorithms or statistical manipulation of such outputs to express the reasonable range of the value of A.

It will be obvious that such variations will compute a bounded range for the value of A whose maximum and minimum values will constitute the most likely securitization values of A which result in the least variance of the solution set of all such securitization values.

The more realistically that Patent A's present value can be estimated, the less risk is involved in the creation of a securitized financial derivative. Having a reasonably predictable risk is essential to having a viable marketplace for the securitization of patents. In the current embodiment, the derivative is structured as a purchase money instrument which pays a fixed royalty at regular intervals over the remaining life of Patent A in exchange for a license to Company T to practice A. Computation of a fixed royalty stream can be accomplished with well known algorithms for determining the required payment to return a predetermined rate of return given an initial principal amount.

(3) Annual Royalty payments on Patent A:
  (i) Annual Royalty=PMT(XRAR,RPL,−TECH-VALUE)=ROYALTY
    where XRAR=Royalty Annuity Rate %/year=7.0%
    PMT( )=Annuity Computation Function By making the additional numerical substitutions set forth in Example 1-A, the numerical results are:
  For
  XRAR=7.0% (Royalty Annuity %/yr)
    RPL=10 Years TECHVALUE=$50.87 Million The resulting output is ROYALTY=$7.24 Million/year.

The selection of values for XRAR (royalty annuity rate) may be arbitrary or may be selected so that the present value of current and future income of Company T where Patent A is sold and back-licensed equals or exceeds the present book value of the business income of Company T over the life of Patent A. While such algorithms such as Eq. (3)(i) constitute prior art in the computation of annuity or debt and principal calculations for pre-existing financial instruments it is novel and useful to create the algorithm of Eq. (3)(i) that integrates the TECHVALUE algorithm to apply Eq. (3)(i) algorithms to intellectual property.

The computations to determine if Company T obtains an increase in present book value if it securitizes Patent A are:
  (4) Net Present Value of Patent A Sale proceeds over remaining Patent life:
    (i) NPV Patent=(1−XCGR+LDCG*XCGR) *XFees* (XBPROE)^RPL/XBPNPVDF^(RPL)=PATENT$
For: LDCG=Defer capital gains? (Y=1, N=0)=0
  XCGR=35% (Capital Gains Tax Rate)
  XFees=TECHVALUE*(1−Fees %)=TECHVALUE
  Fees %=0 (Business Expenses for Transaction, %/TECH-VALUE)
  XBPROE=1.15 (Return on Equity Multiplier)
  XBPNPVDF=1.06 (Net Present Value Discount Divisor)
  RPL=10
  The resulting output is PATENT$=$74.70 Million.
  (ii) Profits−License Royalties For Year N=(IREV*(1+RVGR)^(N−1)−(IREV*(MTL+MFGOH+SALE-SEXP+ADMN+R&DEXP))*(1+XINFLRATE)^(N−1)−ROYALTY)*(1−XTAXRATE)/(1+XNPVDF)^(N−1)=NEWNET(N)
For: IREV=$25.0 Million (First Year Sales)
  RVGR=3% (Sales Growth %/year)
  N=1 to RPL (Years of Unexpired Patent life)
  RPL=10 years (Remaining Legal Life o Patent A)
  MTL=20% (Material Cost as % Sales)
  MFGOH=10% (Manufacturing Overhead as Sales)
  SALESEXP=15% (Sales Cost as % Sales)
  ADMN=10% (Administration as % Sales)
  R&DEXP=5% (Continuing R&D on α as % Sales)
  XINFLRATE=0% (Inflation %/year)
  XNPVDF=6% (Net Present Value Discount %/yr)
  XTAXRATE=35% (Ordinary Income Tax Rate %
  ROYALTY=$7.24 Million (Annual Royalty)
  The resulting output NEWNET(N) for years N=1 to 10 years is:

| N (Year) | 1 | 2 | 3 | 4 | 5 | 6 | 7 | 8 | 9 | 10 |
|---|---|---|---|---|---|---|---|---|---|---|
| NEWNET (N) (Mil $) | $1.8 | $2.2 | $2.5 | $2.8 | $3.0 | $3.3 | $3.5 | $3.7 | $3.8 | $4.0 |

(iii) New Book Value=NPV and ROE Adjustments to Sum of NEWNET(N)=((FOR N=1, N=RPL−1), (XBPROE*NEWNET(N)/XBPNPVDF+NEWNET(N+1)): (XBPROE*NEWNET(RPL−1)/XBPNPVDF+NEWNET(RPL))+PATENT$ NEWBOOK For:
  XBPROE=1.15 (Return on Equity Multiplier)
  XBPNPVDF=1.06 (Net Present Value Divisor)
  RPL=10 years (Unexpired Patent Life) and

| N (Year) | 1 | 2 | 3 | 4 | 5 | 6 | 7 | 8 | 9 | 10 |
|---|---|---|---|---|---|---|---|---|---|---|
| NEWNET (N) (Mil $) | $1.8 | $2.2 | $2.5 | $2.8 | $3.0 | $3.3 | $3.5 | $3.7 | $3.8 | $4.0 |

The resulting output is NEWBOOK=$117.49 Million.

(iv) Change in Book Value=NEWBOOK−BOOK=VALUECHANGE

For:
NEWBOOK $117.49 Million
BOOK $99.37 Million

The resulting output is CHANGEVALUE=$18.12 Million

The foregoing algorithms permit Company T to compare the difference between BOOK and NEWBOOK. If CHANGEVALUE>0, it is to Company T's advantage to sell and back license Patent A. The algorithms also permit Company T to determine any interim CHANGEVALUE(N) between NEWBOOK(N) and BOOK(N) by substituting any year N for the variable RPL where $1 \leq N \leq RPL$.

The invention claimed is:

1. An electronic data processing method comprising:
   a) identifying an intellectual property;
   b) identifying initial ownership of said intellectual property;
   c) assessing a value for said intellectual property using at least one algorithm;
   d) obtaining title to said intellectual property;
      <d1> in exchange, paying the initial ownership, from a general trust account, an amount not more than the assessed value of said intellectual property;
      <d2> obtaining funding for said general trust account from a plurality of initial investor accounts;
   e) creating said investor accounts by identifying a plurality of investors, obtaining an initial amount from each of said investors and associating in at least one electronic database at least a portion of said initial amount with at least one investor account for each said investor;
   f) granting a license to said initial ownership to use said intellectual property in exchange for at least one payment from said initial ownership;
   g) allocating said at least one payment from said initial ownership to said general trust account in the at least one electronic database;
   h) allocating payments from said general trust account to at least one of said investor accounts in the at least one electronic database;
   i) identifying at least one other intellectual property;
   j) identifying initial ownership of said at least one other intellectual property;
   k) assessing a value for said at least one other intellectual property using the at least one algorithm;
   l) obtaining title to said at least one other intellectual property in exchange for paying not more than the assessed value of said at least one other intellectual property to said initial ownership;
      <l1> obtaining said payment to the initial ownership from a general trust account;
      <l2> obtaining funding for said general trust account from at least one subsequent investor account;
   m) creating said subsequent investor accounts in the at least one electronic database by identifying a plurality of investors, obtaining an initial amount from each of said subsequent investors and associating at least a portion of said initial amount with said investor account in the at least one electronic database for each said subsequent investor;
   n) granting a license to said initial ownership to use said at least one other intellectual property in exchange for at least one payment from said initial ownership;
   o) allocating said at least one payment for said license for said at least one other intellectual property from said initial ownership to said general trust account in the at least one electronic database;
   p) allocating payments from said general trust account to at least one of said subsequent investor accounts in the at least one electronic database.

2. The method of claim 1 further comprising granting a limited license to a party other than the original user of said intellectual property and obtaining at least one payment from said licensee of said intellectual property for a license to use said intellectual property.

3. The method of claim 1 further comprising allocating payments from said general trust account to at least one account other than an investor account in the at least one electronic database.

4. The method of claim 1 further comprising allocating payments to said investor accounts in the at least one electronic database using at least one algorithm that considers factors in addition to the initial amount obtained from said investor.

5. The method of claim 1 wherein at least one subsequent investor account and at least one initial investor account are the same.

6. The method of claim 1 wherein the subsequent investor accounts are different from the at least one initial investor account.

* * * * *